United States Patent
Vorobiev et al.

(10) Patent No.: US 6,731,701 B2
(45) Date of Patent: May 4, 2004

(54) NAVIGATION DATA PREDICTION FOR GPS AND GLONASS WEAK SIGNAL TRACKING

(75) Inventors: Michael V. Vorobiev, Moscow (RU); Javad Ashjaee, Saratoga, CA (US)

(73) Assignee: Topcon GPS LLC, Pleasanton, CA (US)

( * ) Notice: Subject to any disclaimer, the term of this patent is extended or adjusted under 35 U.S.C. 154(b) by 7 days.

(21) Appl. No.: 09/939,976

(22) Filed: Aug. 27, 2001

(65) Prior Publication Data
US 2003/0152134 A1 Aug. 14, 2003

(51) Int. Cl.[7] .......................... H04L 27/06; H04B 1/69; H04B 7/185
(52) U.S. Cl. ................... 375/342; 375/130; 342/357.12
(58) Field of Search ................. 375/130, 140, 375/147, 340, 342, 343, 354, 373, 376, 365, 366, 367, 368; 342/357.01–357.12; 701/200, 207, 213, 214, 215, 216; 455/130

(56) References Cited

U.S. PATENT DOCUMENTS

| | | | |
|---|---|---|---|
| 5,379,224 A | * 1/1995 | Brown et al. | 701/215 |
| 5,486,834 A | * 1/1996 | Lennen | 342/357.12 |
| 5,884,214 A | 3/1999 | Krasner | 701/207 |
| 6,052,081 A | 4/2000 | Krasner | 342/357.02 |
| 6,175,725 B1 | * 1/2001 | Auber | 455/130 |
| 6,452,545 B2 | * 9/2002 | Araki et al. | 342/357.15 |
| 6,496,533 B2 | * 12/2002 | Lennen | 375/147 |

OTHER PUBLICATIONS

Weill, Lawrence, "Ultra–High Performance Differential Systems: Extending Accuracy and Weak–Signal Tracking Capability," Proceedings of ION, Sep. 16–19, 1997, pp. 1753–1762.

"ICD–6PS–200: Navstar GPS Space Segment/Navigation User Interface," US Government Document Declassified, Sep. 25, 1997, pp.

* cited by examiner

*Primary Examiner*—Chieh M. Fan
(74) *Attorney, Agent, or Firm*—Sheppard Mullin Richter & Hampton LLP

(57) ABSTRACT

Prediction methods for navigation message symbols of satellite systems, such as GPS (Global Positioning System) and GLONASS (Global Orbiting Navigation System), that use information repetition in navigation data messages are disclosed. The methods enable one to eliminate the impact of symbol modulation for a received signal on the threshold performance of any navigation receiver, thereby permitting its operation in severe environments when the carrier-to-noise ratio $C/N_0$ of "weak" satellite signals falls to levels below $C/N_0=20$ dB*Hz.

20 Claims, 8 Drawing Sheets

PRIOR ART  FIG. 1

| Instruction Set #1 directs the data processor to read from the data input port the symbols of the first group at their predetermined locations within the frames of the information data stream signal |
|---|

| Instruction Set #2 directs the data processor to store in a second computer-readable medium a sequence of the detected symbol values of the first group over a set of M frames and a representation of the location of each detected symbol within the set of M frames |
|---|

| Instruction Set #3 directs the data processor to read the symbols of the first group stored in the second computer-readable medium and to output values representative of the stored symbols of the first group to the data output port at the locations within the frames at which the symbols were initially detected |
|---|

| Instruction Set #4 directs the data processor to collect a second sequence of detected symbol values of the first group over a subsequent set of M frames and to compare the detected symbol values of the subsequent set to the detected symbol values of the set stored in the second computer-readable medium to find differences, said fourth set of instructions comprising a subset of instructions which invokes an execution of the second set of instructions when the number of differences exceeds a pre-set amount |
|---|

| Instruction Set #5 directs the data processor to generate and output on the data output port predicted symbol values of the hand-over words. Instruction Set #5 has the following sub-sets of instructions:<br>• Sub-set #1 directs the data processor to obtain the values of the data-flags of each hand-over word from previously known information.<br>• Sub-set #2 directs the data processor to generate a time signal which is at least approximately representative of the current time of the week.<br>• Sub-set #3 directs the data processor to predicted from the time signal the numerical identity of an upcoming sub-frame that will be transmitted by the satellite and to predict the value of the time of the week which said upcoming sub-frame will contain.<br>• Sub-set #4 directs the data processor to generate a replica of the hand-over word for an upcoming sub-frame by generating a first set of symbols representing the predicted value of the time of the week, generating a second set of symbols representative of the data-flags of the upcoming hand-over word, generating a third set of symbols representative of the predicted numerical identity of the upcoming sub-frame, and generating a fourth set of parity-bit symbols and related fifth set of adjustment symbols on the basis of the values of the previously three generated sets of symbols. |
|---|

COMPUTER-READABLE MEDIUM

FIG. 10

NAVIGATION DATA PREDICTION FOR GPS AND GLONASS WEAK SIGNAL TRACKING

FIELD OF THE INVENTION

The present invention relates to receivers, utilized for range measurements, which use radio signals modulated with navigation message symbols, and which function in environments where signal power may not be sufficient for proper operation of conventional receivers.

BACKGROUND OF THE INVENTION

Current navigation GPS/GLONASS receivers usually track satellite signal parameters with tracking estimators such as phase lock loops (PLLs) and delay lock loops (DLLs).

A typical global positioning satellite signal comprises a high frequency carrier signal which is modulated by one or more pseudo-random number sequences (PR-codes) of lower frequency, which in turn is modulated a 50 Hz data stream which provides navigational information. The task of a phase-lock loop is to track the high-frequency carrier signal or a down-converted version thereof, the latter being the typical situation, and the task of a DLL is to track a pseudo-random number sequence. The 50 Hz data stream in the received satellite signal is a barrier for the improvement of tracking system threshold characteristics. In this case, a symbol demodulation method determines the ultimate threshold parameters of the tracking system.

The same problem of interference immunity is the key performance for modern navigation receivers that employ processing of discrete signal records with high-speed signal processors instead of tracking measuring estimators.

In order to increase the interference immunity of the measurements of the signal carrier phase and code delay (pseudorange), it is necessary to eliminate the signal symbol modulation of the 50 Hz data stream. In this case, an extra receiver, located in certainly favorable conditions, is used to provide error free symbol demodulation. Let us call such a receiver a base station, while the other receiver whose location is to be measured will be called a rover station. One of the interference immunity methods for the receiver-rover system is to transmit the demodulated symbol stream from the base station to the rover station. (Lawrence R. Weill, "Ultra-High Performance Differential Systems: Extending Accuracy and Weak-Signal Tracking Capability," *Proceedings of the 9th International Technical Meeting of the Satellite Division of the Institute of Navigation, ION GPS-96*, Sep. 17–20, 1996, pages 1753–1762).

The drawbacks of this method are, first, the necessity of the base station to provide the rover station with navigation symbols; second, the fact that the method's efficiency for noise immunity tracking depends upon the capabilities of a radio link (e.g., radio link delay, partial loss of symbols due to short-term interruptions in the radio link or fading); third, the necessity to account for the delay in the transmission of navigation symbols from the base station to the rover, which results in a substantial complicating of the rover's firmware.

Another method (U.S. Pat. No. 6,052,081) suggests that a rover remove P/N data and create a record of the satellite data message, and thereafter transmit the record to a base station. The base station then performs a cross correlation of the record transmitted from the rover with a "reference" record made by the base station. From this cross correlation, the base station determines the time of the transmitted record instead of using the rover to demodulate this information (ephemeris reading). With such a processing, the key moment is the use of navigation symbols demodulated on the base station.

The disadvantages of the above method are, first, the usage of the auxiliary base station for determining the satellite time for the signal that was received at the rover; second, the method allows measurements only of pseudoranges at the rover, and not carrier phases of the received satellite signals.

Accordingly, there is a need to provide for a more simple and reliable way of improving the tracking system threshold characteristics for weak signals and the interference immunity for all signals in receivers of GPS and GLONASS satellite signals.

SUMMARY OF THE INVENTION

The present invention is directed to methods and apparatus for predicting navigation symbols for use in a global positioning tracking processes. The navigation symbols are transmitted from a global positioning satellite in the form of a carrier signal modulated by a data-stream signal comprising the symbols. The navigation data symbols are conveyed in a sequence of one or more repeating frames, with a first group of symbols being repeated within the stream once every number M of frames at predetermined locations in the frames. For the present invention, M can be equal to or greater than 1.

An exemplary method according to the present invention comprising the first step of detecting the symbols of the first group within the frames of the information data stream signal, and the second step of storing in a memory a sequence of the detected symbol values of the first group over at least M frames. The method thereafter provides the sequence stored in the memory to the global positioning tracking process. The exemplary method may subsequently monitor the data-stream signal to detect a change in the symbol values of the first group. This may be done by detecting the symbols of the first group within subsequently transmit frames, comparing their values with the sequence of previously detected symbol values stored in memory to find differences, and counting the number of differences encountered since the start of a groups of frames. If the number of differences exceeds a predetermined number, such as for example a number between 10 and 30, the method may then repeat the above described first and second steps.

Another exemplary method according to the present invention comprising the step of detecting the symbols of the first group within the frames of the information data stream signal, and the step of storing in a memory a sequence of the detected symbol values of the first group over at least M frames. The method thereafter modifies one or more correlation signals which are input to a discriminator of a satellite tracking channel (e.g., PLL discriminator, DLL discriminator) in relation to the sequence stored in the memory.

The use of navigation symbol prediction in the above ways enables a substantial improvement in the receiver's tracking threshold performance (for example, up to 10 dB).

Accordingly, it is an object of the present invention to improve the tracking performance of satellite tracking channels for GPS and GLONASS navigation satellites.

It is another object of the present invention to improve the interference immunity for navigation receivers.

These and other objects of the present invention will become apparent to those skilled in the art from the follow-

BRIEF DESCRIPTION OF THE DRAWINGS

FIG. 10 shows an exemplary computer program product according to the present invention.

DETAILED DESCRIPTION OF THE INVENTION

Brief Description of the GPS Navigation Data Structure

Figure 1:
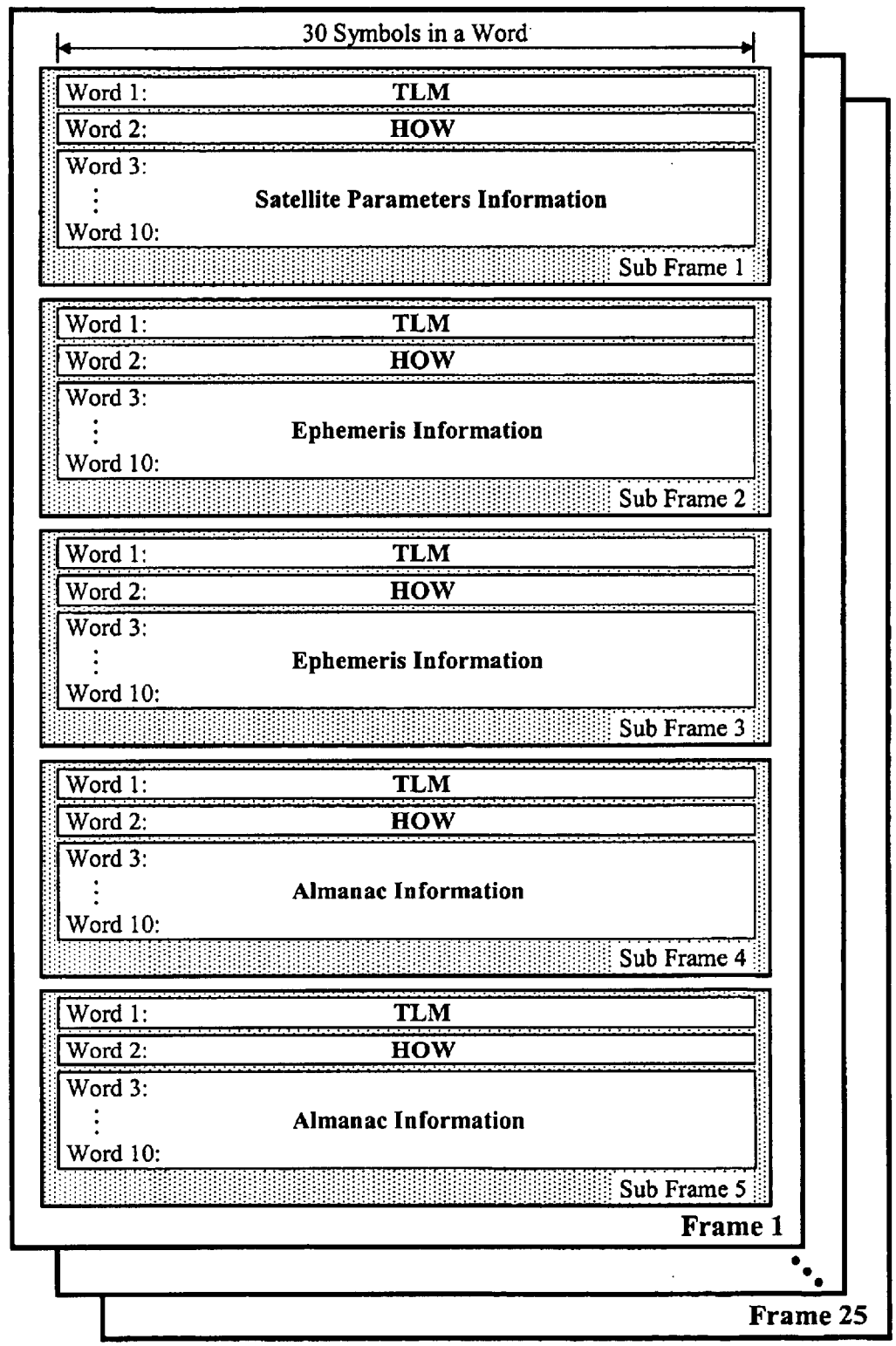
FIG. 1 shows a structure of GPS navigation data according to the prior art.

Referring to FIG. 1, one complete navigation data message of a GPS satellite consists of 25 frames and has a duration of 750 seconds (12.5 minutes). One frame is transmitted for 30 seconds and includes 5 sub-frames. Each sub-frame has 10 words, and each word contains 30 binary symbols (bits), among those there are six parity bits. A symbol has duration of 20 ms (milliseconds). So, a complete navigation message includes 37500 symbols.

In each sub-frame, a telemetry word (TLM-word) and a hand-over word (HOW-word) are transmitted first. The first seventeen bits of the hand-over word contain a value representative of the time of the week, as measured from midnight Saturday, UTC time for GPS. The next eight words, referred to as words 3–10, provide the clock, ephemeris, and almanac data. Specifically, the first sub-frame contains satellite clock parameters and other satellite information. Sub-frames 2 and 3 contain ephemeris data. The fourth and fifth sub-frames include almanac data.

Data within the first, second, and third sub-frames repeats in every frame (and thus repeats every 30 seconds). The complete Almanac is distributed among the 25 frames in sub-frames 4 and 5 thereof, and one must read through all 25 frames to obtain the complete Almanac. Accordingly, the complete Almanac repeats once every 750 seconds. The Ephemeris data is changed once every 1 to 6 hours, and is usually changed once every two hours. The period for changing the almanac data does not exceed 6 days. However, it is possible that ephemeris and almanac data can be changed more often, and not in pre-specified time intervals.

Collecting and Storing Navigation Symbols According to the Present Invention (Initialization Stage)

The major portion of information in the navigation data message is repetitive: ephemeris data repeats every 30 seconds, almanac data repeats every 750 seconds. The TLM word from each satellite is also repetitive, and normally can be determined by a priori knowledge. However, the time of week (TOW) value transmitted in each hand-over word does not repeat. The TOW values are transmitted every 6 seconds (with each sub-frame). The TOW value increases by one unit every sub-frame, starting from the beginning of the week (midnight Saturday, GPS time, which follows UTC time except for leap seconds). Therefore, the inventors have recognized that these words can be predicted in the methods according to the present invention. To initialize the prediction methods for navigation data symbols according to the present invention, preliminary collection of the following data, which are represented as a sequence of symbols, is performed:

1. TLM words (separately for each satellite);
2. Part of HOW-words (except for TOW value);
3. Ephemeris data words 3–10 of the first, second and third sub-frames (separately for each satellite);
4. Almanac data words 3–10 of the fourth and fifth sub-frames in 25 frames (separately for each satellite).

A navigation word contains 30 bits; this allows one to keep it in a 32-digit integer variable (e.g., a 32-bit memory word of a micro-processor, or of a non-volatile memory).

It takes from 12.5 to 25 minutes starting from a satellite lock-on to completely perform this task. It should be noted that the satellite signal needs to have a carrier-to-noise ratio ($C/N_0$) which is high enough (e.g., greater than 30 dB*Hz) to demodulate the symbols with a low error probability.

To reduce the receiver's initialization time after it is turned off and thereafter turned on, it is preferred to record all the collected symbols in a nonvolatile memory of the receiver-rover. This allows one to not have to collect them every time the receiver is turned off and later turned on again, which can frequently occur within a relatively short time (e.g., an hour) for some types of surveying applications.

Prediction of Navigation Symbols

Figure 2:
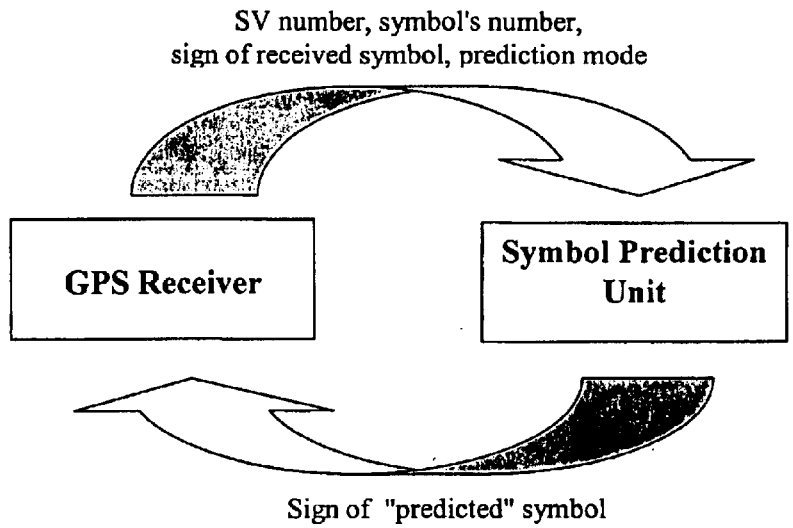
FIG. 2 illustrates an information change between a GPS receiver and symbol prediction unit according to the present invention.

Once the above initialization stage has been completed for a satellite (e.g., collecting almanac and ephemeris data as a symbol sequence), it is possible to generate (predict) a sign of the current navigation symbol and use this sign to eliminate the effects of the 50-Hz signal modulation. As shown in FIG. 2, satellite's number and the navigation system time (or symbol's number) are input parameters for this procedure. Based on this information there exists the search for the corresponding symbol in the recorded ephemeris or almanac symbol sequences, or a symbol is generated if time moment matches the time interval of the HOW-word.

Figures 3, 5:
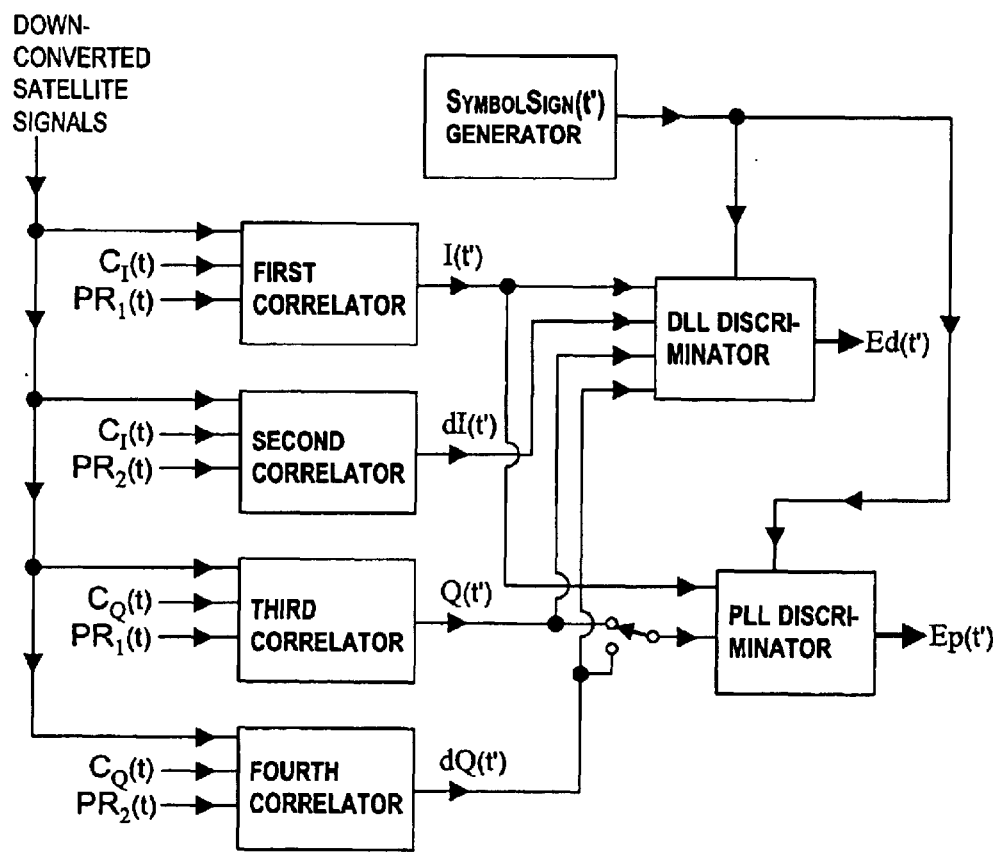
FIG. 3 shows the bit plan of a GPS HOW-word according to the prior art.
FIG. 5 shows an arrangement of the correlators and PLL and DLL discriminators according to one implementation according to the present invention.

To generate HOW-word symbol a synthesis of the whole word is carried out (i.e., sub-frame number is computed; parity bits are calculated). FIG. 3 shows the format of the HOW word of each frame. The first seventeen (17) bits hold the TOW count, which is incremented in value by one each sub-frame, starting from a value of zero set each Saturday at midnight (GPS time). The next two bits M and S, which are the eighteenth (18-th) and nineteenth (19-th) bits, hold flags which represent the current state of the momentum flag and the synchronization (anti-spoof) flag, respectively. These bits rarely change, and their current values are preferably recorded by the above collection step. The next three bits (20–22) contain an integer identifier for the sub-frame. The bits have the following values for sub-frames 1–5, respectively: (0, 0, 1), (0, 1, 0), (0, 1, 1), (1, 0, 0), and (1, 0, 1). These bits, therefore, can be generated predictably based on the sub-frame number, which we know. The last six (6) bits of the HOW-word are parity bits which are generated based on an extended Hamming (32, 26) block code of n=32 symbols and k=26 information bits, where only 24 of these bits are true information bits (i.e., the first 24 bits of the HOW). The other two bits of the 26 information bits are the last two bits of the previous word. The last two parity bits ($P_5$, $P_6$) of each HOW word are zero. This is accomplished by an appropriate adjustment of the values of bits 23 and 24 of the HOW-word, which we have called adjustment bits $A_{23}$ and $A_{24}$.

The parity bits $P_1$–$P_4$ and the adjustment bits $A_{23}$ and $A_{24}$ are generated in the following manner. First, we name the last two bits of the previous words $D_{29}^*$ and $D_{30}^*$, and find their values from the previously recorded telemetry word. Next, we generate the TOW count based on the time, take the recorded values of bits M and S, and generate the bits for the sub-frame ID, and then assembly these 22 bits in order and identify them with the names $D_1$ through $D_{22}$, respectively. We then generate the following 22 source bits $d_i$, i=1 to 22 by the Boolean equation: $d_i = D_i(+)D_{30}^*$ for i=1 to 22, where the symbol "(+)" represents the exclusive-OR logic operation. We then generate adjustment bit $A_{24}$ from the following Boolean equation:

$$A_{24} = d_1(+)d_3(+)d_5(+)d_6(+)d_7(+)d_9(+)d_{10}(+)$$
$$d_{14}(+)d_{15}(+)d_{16}(+)d_{17}(+)d_{18}(+)d_{21}(+)d_{22}.$$

We then generate the adjustment bit $A_{23}$ from the following Boolean equation:

$$A_{23} = d_3(+)d_5(+)d_6(+)d_8(+)d_9(+)d_{10}(+)d_{11}(+)$$
$$d_{13}(+)d_{15}(+)d_{19}(+)d_{22}(+)d_{24},$$

where $d_{24} = D_{30}^*(+)A_{24}$. The parity bits $P_1$–$P_4$ are then generated as follows:

$$P_1 = D_{29}^*(+)d_1(+)d_2(+)d_3(+)d_5(+)d_6(+)d_{10}(+)d_{11}(+)$$
$$d_{12}(+)d_{13}(+)d_{14}(+)d_{17}(+)d_{18}(+)d_{20}(+)d_{23}$$
$$P_2 = D_{30}^*(+)d_2(+)d_3(+)d_4(+)d_6(+)d_7(+)d_{11}(+)d_{12}(+)$$
$$d_{13}(+)d_{14}(+)d_{15}(+)d_{18}(+)d_{19}(+)d_{21}(+)d_{24}$$
$$P_3 = D_{29}^*(+)d_1(+)d_3(+)d_4(+)d_5(+)d_7(+)d_8(+)d_{12}(+)$$
$$d_{13}(+)d_{14}(+)d_{15}(+)d_{16}(+)d_{19}(+)d_{20}(+)d_{22}$$
$$P_4 = D_{30}^*(+)d_2(+)d_4(+)d_5(+)d_6(+)d_8(+)d_9(+)d_{13}(+)$$
$$d_{14}(+)d_{15}(+)d_{16}(+)d_{17}(+)d_{20}(+)d_{21}(+)d_{23}.$$

Accordingly, in preferred embodiments of the present invention, a stream of predicted navigation systems may be generated by reading out, in sequence, the stored values for the symbols which do not change over a course of several frames to several tens of frames, and generating the HOW-words of each sub-frame as indicated above. This process is usually carried out for each satellite, using a separate set of recorded navigation symbols and a separate instance of the HOW-word prediction process.

Updating Ephemeris and Almanac Data

Ephemeris data are usually updated once every two hours (at the beginning of each even hour of the navigation system time). However, more frequent updates are possible, and they can occur at unpredictable time moments. The exact update time for the almanac data is not known in advance like it is for the ephemeris data.

So, to detect the moment when an update of the navigational information occurs, the present invention monitors the received symbols to detect a change in them with respect to their previously recorded values. A first exemplary method according to the present invention which is implemented in a stand-alone global positioning receiver has two operation modes:

1) Collection mode, and
2) Use mode.

The Collection mode detects and stores the symbols in a memory, monitors them to detect subsequent changes, and re-records them in memory if they have been changed. In this mode, the recorded symbol sequences are not used for symbol demodulation. Symbol demodulation is performed in the Use mode. A switch between modes is performed upon a command from the operator. This Use mode is employed when the operator wants to improve tracking threshold characteristics of the receiver, or to increase the interference immunity of the receiver. There is no data monitoring in the Use mode because a disagreement between a demodulated symbol and predicted symbol can be caused by both a change of navigation data and demodulation error due to a weak signal.

Symbol monitoring in the Collection mode comprises a comparison of current conventionally demodulated symbols and symbols which were previously collected and stored. In the preferred case, if there are more than 10 to 30 misfits (i.e., disagreements) between the two sets of symbols, the data information used for prediction is deleted and re-collected. Since the ephemeris data and the almanac data may be updated at different times, the task of deleting and recollecting the ephemeris data and the task of deleting and recollecting the almanac data are preferably performed separately from one another, and preferably as needed. The step of monitoring the ephemeris data for changes and the step of monitoring the almanac data are preferably performed together, but may be performed separately from one another. As a practical matter, data monitoring is possible only when the satellite signal power is high enough to demodulate symbols with a negligibly small error probability.

Using a Base Station

To reduce initialization time of the proposed method, one can use an extra (base) receiver that could transmit symbol sequences needed for prediction. In this case, the rover station should preferably not collect the data symbols or monitor them. These operations are preferably carried out at the base station which operates in the Collection mode. The rover station can operate in the Use mode all the time. In one implementation, the base station can provide a continual real-time stream of predicted symbols to the rover over a communications link. In another implementation, the base station can provide predicted symbols for 25 frames, except for the hand-over words, to the rover station over the communications link, and allow the rover station to complete the hand-over words from its clock, as each hand-over word is needed. In this implementation, the base station can transmit updates to the frame information when they are changed. Unlike known techniques where information is transmitted from the base station to the rover, the proposed method is not assumed to operate the communication link only in real-time mode. Operating the communication link in real-time essentially complicates the satellite tracking task for the receiver-rover due to delays in transmitting the navigation data over a communication link.

Use of the Predicted Symbols in Demodulation

The predicted symbols for each satellite may be used by the rover station in a number of ways to "demodulate" the navigation symbols from the satellite signal, or more specifically, to reduce the effects of the navigation symbols on the tracking channel's ability to track the PR-code signal and carrier signal transmitted by the satellite. Such a tracking channel typically comprises a phase-lock loop (PLL) which tracks the phase of the satellite's carrier signal with a locally-generated reference carrier signal, and a delay-lock loop (DLL) which tracks the delay of one of the satellite's PR-codes (usually the C/A code) with one or two locally-generated reference PR-codes. From the point of view of prior art PLLs and DLLs, the navigation symbols introduce unpredictable phase reversals in the satellite's carrier signal and unpredictable sign reversals in the satellite's PR-code at a rate of up to once every 20 milliseconds (ms). Thus, the PLLs and DLLs have had to correlate their reference signals against the satellite's carrier and code signals within short times spans of less than 20 ms. In some prior art PLL implementations, a short correlation period of less than 20 ms is used anyway in order to increase the reaction speed (e.g., response bandwidth) of the loop, and so the 20 ms limitation is not a concern. However, weak satellite signals are a concern in these implementations since the short correlation period makes it difficult for the correlation process to amplify the weak signals. In this case, the correlated signals are near zero, and sometimes can have a sign which opposite to the sign the correlated signal should have. The occurrence of an incorrect sign is a disturbance to the feedback loop of the PLL, and too many such occurrences can cause the PLL loop to malfunction.

Figure 4:
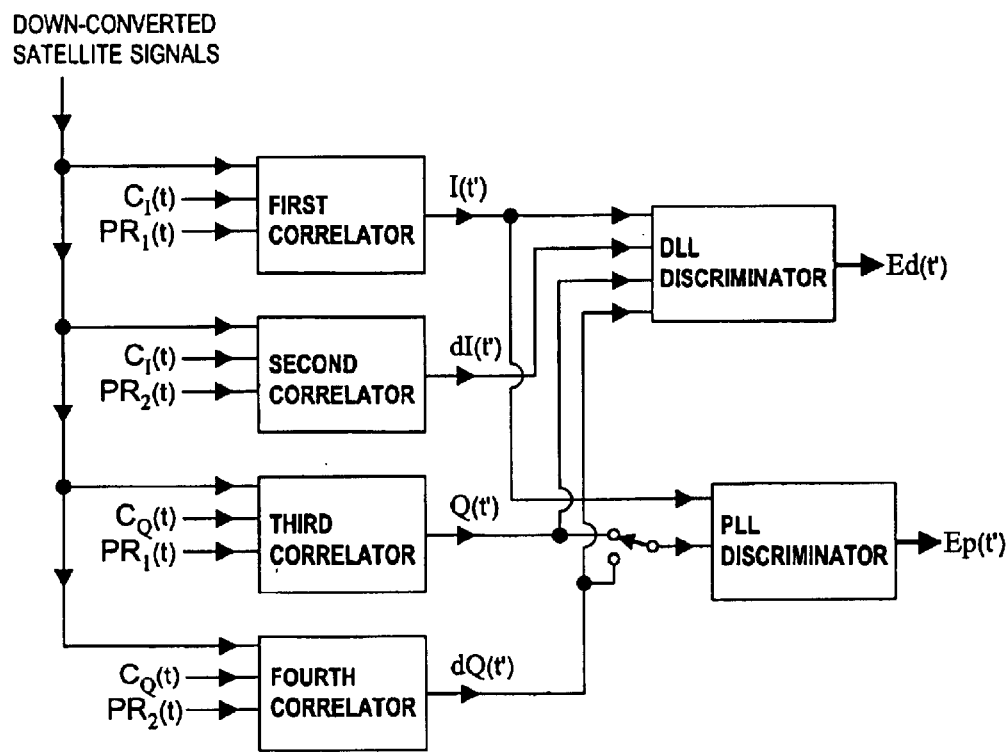
FIG. 4 shows a portion of an exemplary prior art PLL and DLL according to the prior art.

FIG. 4 shows a portion of an exemplary prior art PLL and DLL. After frequency down conversion and digitization at discrete time intervals, the received satellite signal is provided to four correlators, as shown in the figure. The correlator structures are well known to the art, and are therefore only briefly described herein. The reader not skill in this art is referred to established tutorial texts in the GPS art, or to U.S. patent application Ser. Nos. 09/226,774 and 09/330,221, now U.S. pat. Nos. 6,493,378 and 6,313,789, respectively, for background information. The first and second correlators receive the in-phase component of the reference carrier, which is named as $C_I(t)$ herein, and the third and fourth correlators receive the quadrature component of the reference carrier, which is named as $C_Q(t)$ herein. $C_I(t)$ and $C_Q(t)$ are periodic functions, with $C_Q(t)$ being phase-shifted from $C_I(t)$ by 90 degrees. A first PR-reference code, named herein as $PR_1(t)$, is coupled to the first and third correlators, and a second PR-reference code, named herein as $PR_2(t)$, is coupled to the second and fourth correlators. First PR-reference code $PR_1(t)$ typically has a shape which follows the ideal form of the transmitted satellite PR-code, or has a pulsed shaped with generally follows the idea form. Second PR-reference code $PR_2(t)$ has a form which comprises one or more pulses localized around each chip boundary of the PR-code, or localized around only those chip boundaries where the PR-code changes value. $PR_2(t)$ may have many forms. One common form can be derived from the ideal satellite PR-code by a two step process: first, one creates a modified PR-code by copying the ideal satellite PR-code and replacing the infinite transition slopes between the ideal chip boundaries with finite slopes of a desired amount, and second, one then differentiates the modified PR-code with respect to time. Another common form for $PR_2(t)$ can be derived by subtracting two versions of the ideal PR-code, the two versions being shifted in time from one another by a time duration which is less than one-chip duration. In general, the second reference PR-code $PR_2(t)$ is designed to detect the boundary edge between chips.

Each of the correlators multiplies its three digitized input signals together (any order of multiplication is possible), and then accumulates a finite number of multiplication products in an accumulator. The accumulators are periodically read to provide the outputs of the correlators, and the accumulators are subsequently zeroed in preparation for the next accumulation period. Typical accumulation periods are 1 ms, 5 ms, 10 ms, and 20 ms. The output of the first correlator is conventionally named I(t'), the output of the second correlator is conventionally named dI(t'), the output of the third correlator is conventionally named Q(t'), and the output of the fourth correlator is conventionally named dQ(t'). The time parameter t' is noted with a prime symbol ("'") to indicate that its digitized output rate is slower than the digitized rate of the input signals. Correlator outputs I and dI are based upon the in-phase component $C_I$ of the reference carrier, and correlator outputs Q and dQ are based upon the quadrature component $C_Q$ of the reference carrier. Similarly, correlator outputs I and Q are based upon the first PR-reference code $PR_1(t)$, which generally follows the ideal form of the satellite's transmitted PR-code, and correlator outputs dI and dQ are based upon the second PR-reference code $PR_2(t)$, which is typically based on a differential or a differencing of the satellite's ideal PR-code.

The correlator signals I(t') and dI(t') are provided to the DLL's discriminator when the tracking system is of the coherent type (meaning that it uses the PLL to adjust the phase of carrier reference components $C_I$ and $C_Q$). The DLL discriminator generates a loop error signal Ed(t'), which may be generated in any of the following forms, as well as other forms:

Ed(t')=dI(t')*I(t'), or

Ed(t')=dI(t')/I(t'), or

Ed(t')=dI(t')*Sgn(I(t')), or

Ed(t')=dI(t')/Sgn(I(t')), where the function Sgn(*) is the sign function. If the DLL is of the incoherent type, the correlator signals Q and dQ are also provided to the DLL discriminator, and Ed may be generated in the form:

$$Ed(t')=\{I(t')*dI(t')+Q(t')*dQ(t')\}/\{I^2(t')+Q^2(t')\}.$$

The correlation signal I(t'), and one of the correlation signals Q(t') and dQ(t'), are provided to the PLL discriminator, which in turn generates an error signal Ep(t') therefrom. Ep(t') may be generated in any one of the following forms, as well as additional forms based on the correlation signals:

Ep(t')=arctan(Q(t')/I(t')), or

Ep(t')=Q(t')/I(t'), or

Ep(t')=Q(t')*Sgn(I(t')), or

Ep(t')=Q(t')/Sgn(I(t')), or

Ep(t')=Q(t')*I(t'), or

Ep(t')=arctan(dQ(t')/I(t')), or

Ep(t')=dQ(t')/I(t'), or

Ep(t')=dQ(t')*Sgn(I(t')), or

Ep(t')=dQ(t')/Sgn(I(t')), or

Ep(t')=dQ(t')*I(t').

The first five forms generally have more noise immunity than the last six forms, and the last five forms may have better multipath rejection characteristics for some forms of $PR_2(t)$. It may be appreciated that a fifth correlator and a third PR-reference code $PR_3(t)$ may be added to generate a specific form of dQ which is more suitable for multipath rejection than the form generated from $PR_2(t)$, which would be used for the DLL.

The present invention may work with any of the above forms for generating the error signals Ed(t') and Ep(t') by using the following modified forms of the correlator signals in place of I(t'), dI(t'), Q(t'), dQ(t'), respectively:

I*(t')=SymbolSign(t')·I(t'), dI*(t')=SymbolSign(t')·dI(t'),

Q*(t')=SymbolSign(t')·Q(t'), dQ*(t')=SymbolSign(t')·dQ(t').

where SymbolSign(t) represents the predicted navigation symbol for the current time t'. FIG. 5 shows an arrangement of the correlators and PLL and DLL discriminators according to a first implementation according to the present invention where these modified forms are used. In this implementation, SymbolSign(t') is provided directly to the PLL and DLL discriminators where the generation of the modified forms occur during the discriminator's implementation of its specific form. In instances where a discriminator uses the function Sgn(I(t')), it may be appreciated that the Sgn(*) function may be directly replace by SymbolSign(t).

Figure 6:
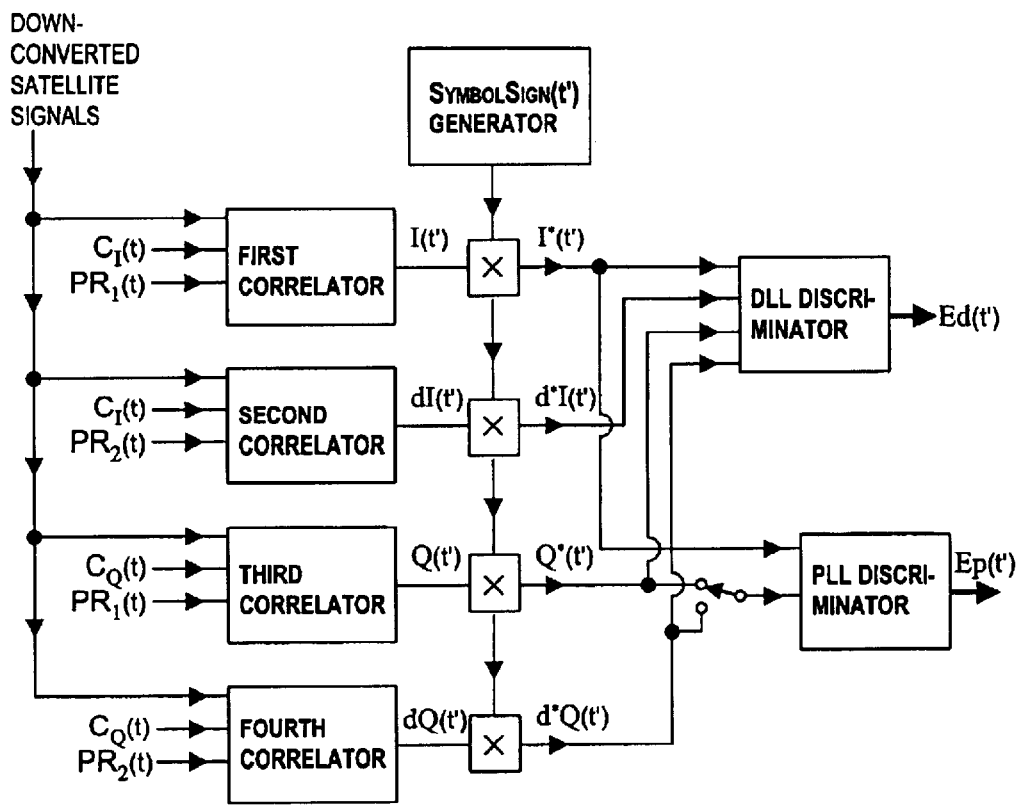
FIG. 6 shows an arrangement of the correlators and PLL and DLL discriminators according to another implementation according to the present invention.

FIG. 6 shows an arrangement of the correlators and PLL and DLL discriminators according to a second implementation according to the present invention where these modified forms are used. In this implementation, four multiplier blocks are added at the outputs of the correlators, each receiving the output SymbolSign(t') and one of the correlator outputs. The modified signals I*(t'), dI*(t'), Q*(t'), and dQ*(t') are thereby generated and coupled to the PLL and DLL discriminators in place of signals I(t'), dI(t'), Q(t'), and dQ(t'), respectively.

Figure 7:
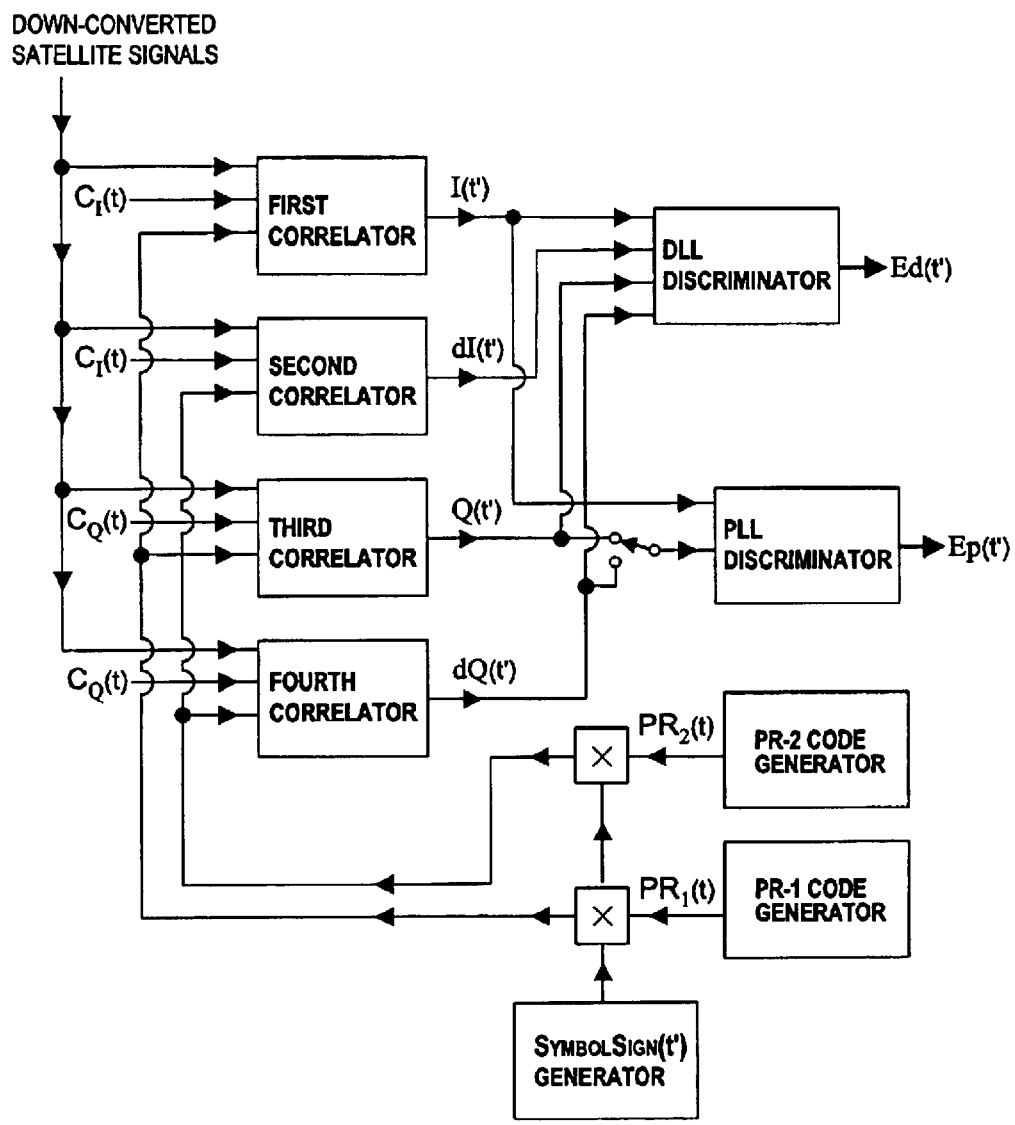
FIGS. 7–9 show additional arrangement of the components according to additional implementations according to the present invention.
Figure 8:
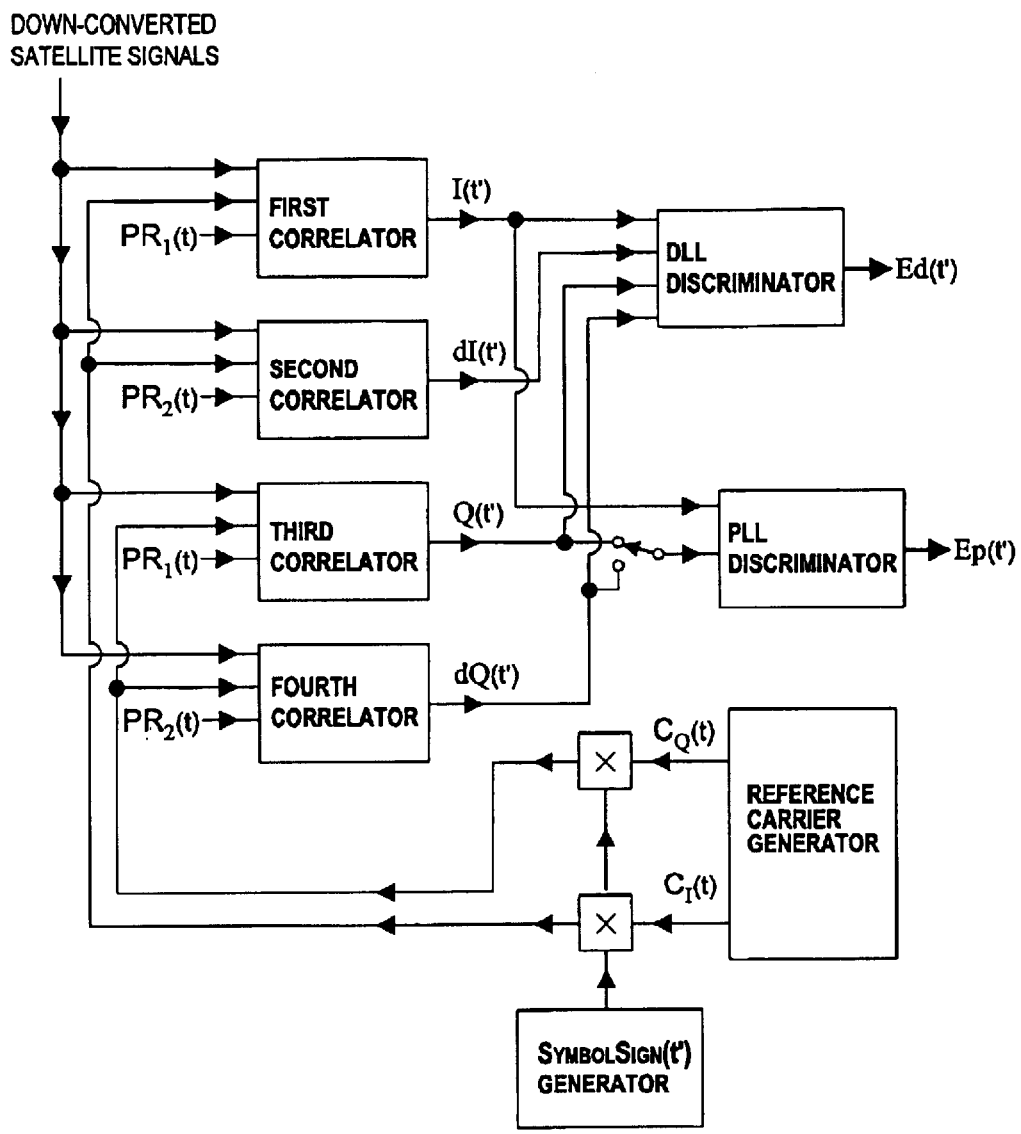
Figure 9:
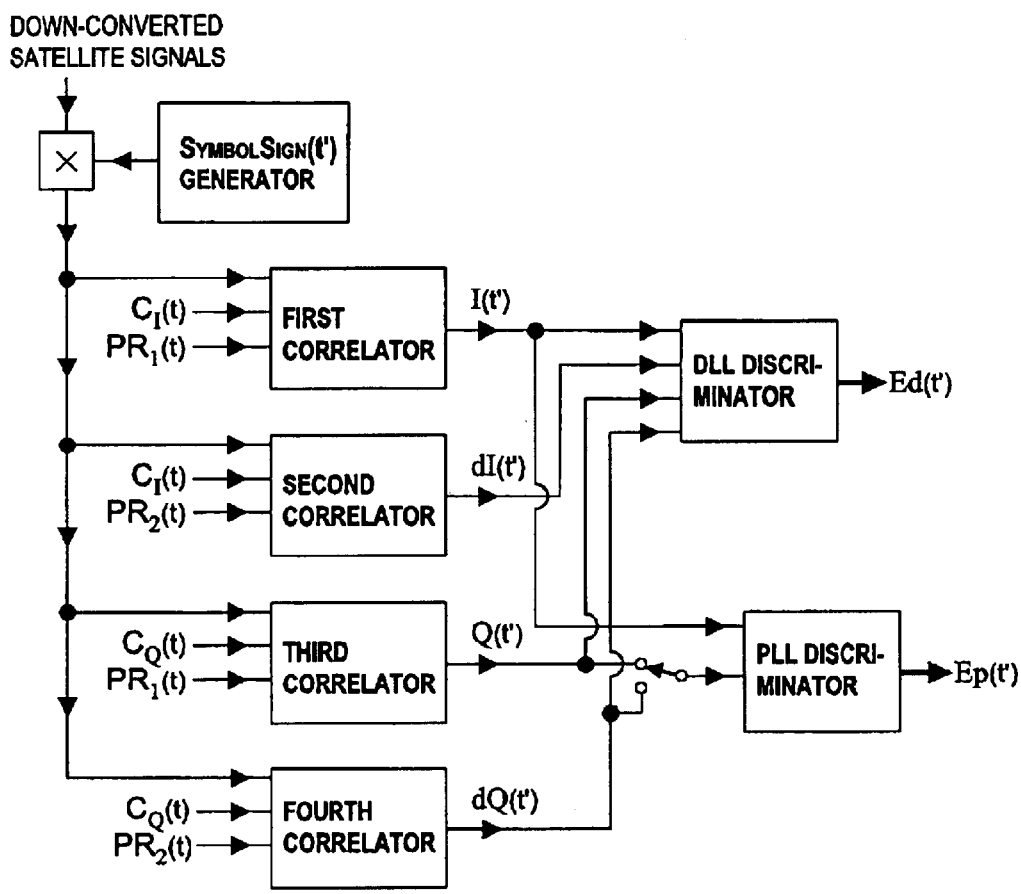

FIGS. 7–9 show respective arrangements of the correlators and PLL and DLL discriminators according to the present invention where SymbolSign(t') is used to remove (demodulate) the low frequency signal. In the implementation shown in FIG. 7, the correlators are provided with versions of the reference code signals which are equal to the previously-described reference code signals $PR_1(t)$ and $PR_2(t)$ multiplied by SymbolSign(t'). In the implementation shown in FIG. 8, the correlators are provided with versions of the carrier reference components which are equal to the previously described carrier reference components $C_I$ and $C_Q$ multiplied by SymbolSign(t'). And in the implementation shown in FIG. 9, the correlators are provided with a version of a down-converted satellite signal which is equal to the previously-described frequency down-converted satellite signal multiplied by SymbolSign(t').

Use of the Predicted Symbols in Discrete Signal Record Processing

The above-described DLL and PLL loops are predominantly used in real-time applications where the satellite signals are being tracked in real time. There are situations where the down-converted satellite signals received by the antenna may be digitized at a relatively high sampling rate and stored in a computer readable memory for later processing. Stored along with the digitized data is the receiver's clock value at a set of selected times, the set being sufficient to subsequently determine the times of all of the digitized samples (e.g., start time and stop time).

Once this data had been stored, it may be later analyzed to determine the position of the antenna at the time the digitized satellite signals were received. U.S. Pat. No. 5,884,214 to Krasner describes a number of methods that maybe used to analyze the stored data. One of the most basic and relatively slow methods is to correlated the stored data against several versions of the PR-reference code and the reference carrier signal which are phase shifted with respect to the stored data by various amounts to find one or two combinations of code shift and carrier shift which provide a high degree of correlation with the stored data. Then the search is further refined around these one or two combinations. These correlations are performed on segments of the stored data which are less than 20 ms in order to avoid a modulating event from the navigation symbols. Even with the use of short correlation segments of less than 20 ms, the occurrence of a symbol change (i.e., symbol boundary) within the correlation segment can occur, which makes it difficult to find a good correlation. The present invention is able to overcome this difficulty by removing the symbol change.

Another approach of record processing is to construct a Fourier transform of the satellite's ideal PR-code over one block of the code (e.g., 1023 chips sampled by 2048 samples), to then construct a Fourier transform of an amplified block of the recorded data covering an equal span of time, starting at the beginning of the recorded data, and to then multiply the Fourier transform of the amplified block of recorded data by the complex conjugate of the Fourier transform of the block of ideal PR-code. The amplified block is created by taking 5 or 10 adjacent sections of the recorded data, each section spanning 1023 chips of the recorded data, multiplying the data within the sections by a complex exponential which is representative of the Doppler frequency shift of the satellite's carrier signal, and then summing the adjacent sections to form a block which is of the same length as 1023 chips. In other words, the first data element in the averaged block is equal to the sum of the first data elements of the adjacent sections, the second data element in the averaged block is equal to the sum of the second data elements of the adjacent sections, and so on. The multiplication of the two previously-described Fourier transforms is a third Fourier transform which is then transformed to the real domain by an inverse-Fourier transform process. Under normal conditions, the resulting time-domain function has a peak whose time offset from the origin is representative of the delay (phase shift) of the reference code with respect to the record data. To amplify this peak and to distinguish it over noise sources, subsequent sections of the recorded data are similarly processes and the resulting time-domain functions added to the time-domain function obtained from the first sections of the recorded data.

However, to perform this last addition step, each resulting time-domain function is squared to remove the effects of the symbol modulation. However, the squaring operation reduces the overall resolution of the process. The present invention may be used to improve the resolution of the process by enabling the resulting time-domain functions to be multiplied by the predicted symbol function SymbolSign(t) instead of the using the squaring operation. In order to synchronize the predicted SymbolSign(t) to the recorded data, one may performed the above operation with the squaring step in order to find a rough estimate of the pseudo-ranges. One may also estimate the pseudoranges at the rover during the recorded time from information stored by the base station and a rough estimate of the rover's location relative to the base station. One may then apply the present invention with different time shifted values of SymbolSign(t) with respect to the recorded data to find a time shift which maximizes the amplitude of the peak. The predicted SymbolSign(t) may be generated by the base station for this embodiment.

Computer Program Products

Any of the above methods of predicting the navigation symbols may be implemented by a respective computer program product which directs a data processor, such as a microcomputer, to undertake the above-described steps. Each computer program product comprises a computer-readable memory, such for example as ROM, RAM, magnetic tape, magnetic disk, etc., and a plurality of sets of instructions embodied on the computer-readable medium, each set directing the data processor to execute a respective step of the method being implemented.

As an example, FIG. 10 shows a exemplary set of five general instruction sets. The first instruction set directs the data processor to read from the data input port the symbols of the first group at their predetermined locations within the frames of the information data stream signal. The second set of instructions directs the data processor to store in a second computer-readable medium a sequence of the detected symbol values of the first group over a set of M frames and a representation of the location of each detected symbol within the set of M frames. The third instruction directs the data processor to generate at the data output port two or more repeating sets of M frames of predicted navigation symbols, the third set of instructions directing the data processor to read the symbols of the first group stored in the second computer-readable medium and to output values representative of the stored symbols of the first group to the data output port at the locations within the frames at which the symbols were initially detected. The fourth set of instructions directs the data processor to collect a second sequence of detected symbol values of the first group over a subsequent set of M frames and to compare the detected symbol values of the subsequent set to the detected symbol values of the set stored in the second computer-readable medium to find differences, the fourth set of instructions comprising a subset of instructions which invokes an execution of the second set of instructions when the number of differences exceeds a pre-set amount.

The fifth set of instructions directs the data processor to generate and output on the data output port predicted symbol values of the hand-over words, and has four sub-sets of instructions. The first sub-set of instructions directs the data processor to obtain the values of the data-flags of each hand-over word from previously known information, and the second sub-set of instructions directs the data processor to generate a time signal which is at least approximately representative of the current time of the week. The third sub-set of instructions directs the data processor to predicted from the time signal the numerical identity of an upcoming sub-frame that will be transmitted by the satellite and to predict the value of the time of the week which said upcoming sub-frame will contain. The fourth sub-set of instructions directs the data processor to generate a replica of the hand-over word for an upcoming sub-frame by generating a first set of symbols representing the predicted value of the time of the week, generating a second set of symbols representative of the data-flags of the upcoming hand-over word, generating a third set of symbols representative of the predicted numerical identity of the upcoming sub-frame, and generating a fourth set of parity-bit symbols and related fifth set of adjustment symbols on the basis of the values of the previously three generated sets of symbols.

From the above description, each of the above instruction sets may be readily implemented by one of ordinary skill in the art.

While the present invention has been particularly described with respect to the illustrated embodiment, it will be appreciated that various alterations, modifications and adaptations may be made based on the present disclosure, and are intended to be within the scope of the present invention. While the invention has been described in connection with what is presently considered to be the most practical and preferred embodiment(s), it is to be understood that the present invention is not limited to the disclosed embodiment(s) but, on the contrary, is intended to cover various modifications and equivalent arrangements included within the scope of the appended claims.

What is claimed is:

1. A method of predicting navigation symbols for use in a global positioning tracking process, the navigation symbols being transmitted from a global positioning satellite in the form of a carrier signal modulated by a data-stream signal comprising the symbols, the navigation data symbols being conveyed in a sequence of one or more repeating frames, said data-stream signal having a first group of symbols which is repeated within the stream once every M number of frames at predetermined locations in the frames, M being equal to or greater than 1, said method comprising:

(a) detecting the symbols of the first group within the frames of the data-stream signal;

(b) storing in a memory a sequence of the detected symbol values of the first group over at least M frames;

(c) providing the sequence stored in the memory to the global positioning tracking process;

(d) subsequently monitoring the data-stream signal to detect a change in the symbol values of the first group, said subsequently monitoring comprising the steps of detecting the symbols of the first group within subsequently transmitted frames, comparing their values with the sequence of previously detected symbol values stored in memory to find differences, and counting the number of differences encountered since the start of a group of frames; and (e) repeating steps (a) and (b) when the number of differences exceeds a predetermined number.

2. The method of claim 1 wherein said predetermined number is in a range between 10 and 30.

3. A method according to claim 1 wherein each frame comprises a plurality of sub-frames, wherein each sub-frame comprises a telemetry word, a hand-over word, and a plurality of data words, the telemetry word comprising a plurality of symbols, the hand-over word comprising a plurality of symbols, and each data word comprising a plurality of symbols, and wherein the first group of symbols comprises the symbols of the data words of the sub-frames of all of the frames.

4. A method according to claim 3 wherein the data words of the sub-frames comprise ephemeris and almanac data.

5. A method according to claim 3 wherein the first group of symbols further comprises the symbols of the telemetry words of the sub-frames of all of the frames.

6. A method according to claim 3 wherein each sub-frame is assigned a predetermined numerical identifier depending upon its position within its frame, and wherein the hand-over word of each sub-frame comprises a first set of symbols representing the current time of the week as of the transmission time of the hand-over word, a second set of symbols representing data-flags which have constant values over the time duration of several frames, a third set of symbols representing the sub-frame's numerical identifier, a fourth set of symbols holding a set of parity bits which are computed on the basis of the values of the symbols in the hand-over word, and a fifth set of adjustment symbols having values which cause the last two parity bits to have zero values.

7. A method according to claim 6 wherein said method further comprises the steps of:

obtaining the values of the data-flags of each hand-over word from previously known information;

generating a time signal which is at least approximately representative of the current time of the week;

predicting the numerical identity of an upcoming sub-frame that will be received from the satellite, predicting the value of the time of the week which said upcoming sub-frame will contain;

generating a replica of the hand-over word for the upcoming sub-frame comprising the steps of generating a first set of symbols representing the predicted value of the time of the week, generating a second set of symbols representative of the data-flags, generating a third set of symbols representative of the predicted numerical identity of the upcoming sub-frame, generating a fourth set of parity-bit symbols and related fifth set of adjustment symbols on the basis of the values of the three previously generated sets of symbols, and providing the replica of the hand-over word to the global positioning tracking process.

8. A method according to claim 1 wherein the carrier signal, as modulated by the data-stream signal, is transmitted by one of the GPS navigation system satellites.

9. A method according to claim 1 wherein the carrier signal, as modulated by the data-stream signal, is transmitted by one of the GLONASS navigation system satellites.

10. A method according to claim 1 wherein the global positioning tracking process is performed by a navigation station, and wherein steps (a)–(e) are performed by the same navigation station.

11. A method according to claim 1 wherein the global positioning tracking process is performed by a first navigation station, wherein steps (a)–(e) are performed by a second navigation station, and wherein step (c) comprises the step of transmitting the stored sequence from the second station to the first station.

12. A method according to claim 1 wherein the global positioning tracking process provides the stored sequence to a discriminator of a phase-lock loop.

13. A method according to claim 1 wherein the global positioning tracking process provides the stored sequence to a discriminator of a delay-lock loop.

14. A method according to claim 1 wherein the global positioning tracking process comprises a discrete signal record process which processes a stored record of satellite signal information with one or more records of intermediate data, and wherein said discrete signal record process multiplies at least one of the one or more records of intermediate data by the sequence stored in memory.

15. A method according to claim 1 wherein the global positioning tracking process multiplies a reference code signal by the stored sequence of symbols to generate a modified reference code signal which is correlated against a transmitted signal of the satellite or a frequency down-converted version thereof.

16. A method according to claim 1 wherein the global positioning tracking process multiplies a reference carrier signal by the stored sequence of symbols to generate a modified reference carrier signal which is correlated against a transmitted signal of the satellite or a frequency down-converted version thereof.

17. A method according to claim 1 wherein the global positioning tracking process multiplies a frequency down-converted version of the carrier signal modulated by the data-stream signal by the stored sequence of symbols before the down-converted version is correlated against a reference signal.

18. A computer program product for directing a data processor to predict navigation symbols for use in a global positioning tracking process, the navigation symbols being transmitted from a global positioning satellite in the form of a carrier signal modulated by a data-stream signal comprising the symbols, the navigation data symbols being conveyed in a sequence of one or more repeating frames, the data-stream signal having a first group of symbols which is repeated within the stream once every M number of frames at predetermined locations in the frames, M being equal to or greater than one, the data processor having a data input port and a data output port, the computer program product comprising:

a first computer-readable medium;

a first set of instructions embodied on the first computer-readable medium which directs the data processor to read from the data input port the symbols of the first group at their predetermined locations within the frames of the data-stream signal thereby providing detected symbol values;

a second set of instructions embodied on the first computer-readable medium which directs the data processor to store in a second computer-readable medium a sequence of the detected symbol values of the first group over a set of M frames and a representation of the location of each detected symbol within the set of M frames; and a third set of instructions embodied on the first computer-readable medium which directs the data processor to generate at the data output port two or more repeating sets of M frames of predicted navigation symbols, said third set of instructions directing the data processor to read the symbols of the first group stored in the second computer-readable medium and to output values representative of the stored symbols of the first group to the data output port at the locations within the frames at which the symbols were initially detected.

19. The computer program product of claim 18 further comprising a fourth set of instructions embodied on the first computer-readable medium which directs the data processor to collect a second sequence of detected symbol values of the first group over a subsequent set of M frames and to compare the detected symbol values of the subsequent set to the detected symbol values of the set stored in the second computer-readable medium to find differences, said fourth set of instructions comprising a subset of instructions which invokes an execution of the second set of instructions when the number of differences exceeds a pre-set amount.

20. The computer program product of claim 18 wherein each frame comprises a plurality of sub-frames, each sub-frame comprises a telemetry word, a hand-over word, and a plurality of data words, the telemetry word comprising a plurality of symbols, the hand-over word comprising a plurality of symbols, and each data word comprising a plurality of symbols, wherein the first group of symbols comprises the symbols of the data words of the sub-frames of all of the frames, wherein each sub-frame is assigned a predetermined numerical identifier depending upon its position within its frame, and wherein the hand-over word of each sub-frame comprises a first set of symbols representing the current time of the week as of the transmission time of the hand-over word, a second set of symbols representing data-flags which have constant values over the time duration of several frames, a third set of symbols representing the sub-frame's numerical identifier, a fourth set of symbols holding a set of parity bits which are computed on the basis of the values of the symbols in the hand-over word, and a fifth set of adjustment symbols having values which cause the last two parity bits to have zero values, wherein the computer program product further comprises:

a fifth set of instructions embodied on the first computer-readable medium which directs the data processor to generate and output on the data output port predicted symbol values of the hand-over words, said fifth set of instructions comprising:
- a first sub-set of instructions which directs the data processor to obtain the values of the data-flags of each hand-over word from previously known information;
- a second sub-set of instructions which directs the data processor to generate a time signal which is at least approximately representative of the current time of the week;
- a third sub-set of instructions which directs the data processor to predict from the time signal the numerical identity of an upcoming sub-frame that will be transmitted by the satellite and to predict the value of the time of the week which said upcoming sub-frame will contain; and
- a fourth sub-set of instructions which directs the data processor to generate a replica of the hand-over word for the upcoming sub-frame by generating a first set of symbols representing the predicted value of the time of the week, generating a second set of symbols representative of the data-flags of the upcoming hand-over word, generating a third set of symbols representative of the predicted numerical identity of the upcoming sub-frame, and generating a fourth set of parity-bit symbols and related fifth set of adjustment symbols on the basis of the three previously generated sets of symbols.

* * * * *